(12) United States Patent
Bucher et al.

(10) Patent No.: US 8,676,713 B2
(45) Date of Patent: Mar. 18, 2014

(54) DYNAMIC CONSTRAINTS FOR CONTENT RIGHTS

(75) Inventors: Timothy Bucher, Los Altos, CA (US); Timothy T. Sullivan, Portola Valley, CA (US); Mark Andrew Ross, San Carlos, CA (US)

(73) Assignee: Dell Products L.P., Round Rock, TX (US)

( * ) Notice: Subject to any disclaimer, the term of this patent is extended or adjusted under 35 U.S.C. 154(b) by 893 days.

(21) Appl. No.: 11/754,850

(22) Filed: May 29, 2007

(65) Prior Publication Data

US 2007/0294180 A1 Dec. 20, 2007

Related U.S. Application Data

(60) Provisional application No. 60/803,484, filed on May 30, 2006.

(51) Int. Cl.
*G06F 21/00* (2013.01)

(52) U.S. Cl.
USPC .......... 705/59; 705/52; 726/27; 726/2; 726/26

(58) Field of Classification Search
USPC ...................................... 705/50–79
See application file for complete search history.

(56) References Cited

U.S. PATENT DOCUMENTS

| | | | |
|---|---|---|---|
| 5,715,403 A * | 2/1998 | Stefik | 705/44 |
| 5,857,020 A * | 1/1999 | Peterson, Jr. | 705/52 |
| 5,991,876 A * | 11/1999 | Johnson et al. | 726/28 |
| 6,226,618 B1 * | 5/2001 | Downs et al. | 705/1 |
| 6,477,649 B2 * | 11/2002 | Kambayashi et al. | 726/27 |
| 2002/0002466 A1 * | 1/2002 | Kambayashi et al. | 705/1 |
| 2002/0029347 A1 * | 3/2002 | Edelman | 713/193 |
| 2002/0049679 A1 | 4/2002 | Russell et al. | |
| 2002/0077986 A1 * | 6/2002 | Kobata et al. | 705/52 |
| 2002/0091645 A1 * | 7/2002 | Tohyama | 705/59 |
| 2002/0104001 A1 | 8/2002 | Lotspiech et al. | |
| 2003/0156719 A1 * | 8/2003 | Cronce | 380/256 |
| 2004/0034786 A1 | 2/2004 | Okamoto et al. | |
| 2004/0102987 A1 * | 5/2004 | Takahashi et al. | 705/1 |
| 2004/0179691 A1 * | 9/2004 | Hori et al. | 380/277 |
| 2006/0272033 A1 * | 11/2006 | Paris et al. | 726/32 |
| 2007/0143228 A1 * | 6/2007 | Jorden et al. | 705/71 |

OTHER PUBLICATIONS

White, "How Computers Work", 6th Edition, QUE, Indianapolis, IN, 2002 (pp. 108-119).*

(Continued)

*Primary Examiner* — Jacob C. Coppola
(74) *Attorney, Agent, or Firm* — Brian Tucker; Kirton McConkie

(57) ABSTRACT

A device for playing digital media comprises a connection for receiving content over a network and a digital rights management ("DRM") module that identifies rights for the received content by accessing a DRM data structure. The DRM data structure can be a temporal cache. The device receives content and the DRM module identifies identifiers associated with the content and/or the device. The DRM module uses the identifiers to access the DRM data structure and identify rights associated with the content. The identified rights are applied to the content to prevent and/or permit activities with respect to the content. Permitted activities for the content may be presented in a display of the device and can be updated as the content changes and/or as rights associated with content change. Content providers and other authorized entities can change the rights associated with particular content by updating the DRM data structure.

8 Claims, 5 Drawing Sheets

(56) References Cited

OTHER PUBLICATIONS

Derfler, "How Networks Work", Bestseller Edition, 1996, Ziff-Davis Press, Emeryville, CA, all pages.*
White, "How Computers Work", Millennium Edition, 1999, Que Corporation, Indianapolis, IN, all pages.*
Gralla, "How the Internet Works", Millennium Edition, 1999, Que Corporation, Indianapolis, IN, all pages.*
Muller, "Desktop Encyclopedia of the Internet", 1999, Artech House Inc., Norwood, MA, all pages.*
Alphadevx.com, Comparison of Relational and Multi-Dimensional Database Structures, downloaded from http://www.alphadevx.com/a/36-Comparison-of-Relational-and-Multi-Dimensional-Database-Structures, all pages.*
DVB—Digital Video Broadcasting: "Digital Video Broadcasting (DVB); Content Protection and Copy Management," DVB Document, vol. A094, Nov. 2005,103 pages, XP007901168.
Supplementary European Search Report and Search Opinion, mailed Aug. 2, 2010, as issued in connection with EP2022006, published Feb. 11, 2009, and corresponding Patent Application No. PCT/US2007/069989, filed May 30, 2007.

* cited by examiner

DYNAMIC CONSTRAINTS FOR CONTENT RIGHTS

CROSS-REFERENCE TO RELATED APPLICATIONS

This application claims the benefit of U.S. Provisional Patent Application Ser. No. 60/803,484 filed May 30, 2006, which application is incorporated herein by reference in its entirety.

BACKGROUND OF THE INVENTION

1. The Field of the Invention

The present invention relates to digital content and related devices. More particularly, embodiments of the invention relate to the management of digital rights in digital content.

2. The Relevant Technology

Digital media is becoming ubiquitous in our society. Many people have access to digital content in one form or another. Not surprisingly, there are many different types of devices that can play the digital content. Personal audio players such as mp3 players, for example, can play digital audio content. Personal audio players enable media content to be loaded from a user's library as well as added to the library by purchasing audio content over the Internet.

One of the concerns with devices that can play digital content such as personal audio players relates to copyright concerns. In fact, the rights of a user, the owner, and the provider of digital content are a major concern.

One of the ways that these concerns are addressed is through the use of digital rights management ("DRM"), which generally refers to various schemes that are intended to control access to digital media such as digital audio or video. Digital rights management is not limited to copyright concerns however, and can be used by the provider of the content to impose restrictions in addition to normal copyright protections.

In sum, digital rights is an issue that is difficult to manage because content can be received from different types of sources, in different formats, and over different types of networks. The ability to manage the rights associated with the content in various contexts is currently not manageable with conventional DRM schemes.

BRIEF SUMMARY OF THE INVENTION

These and other limitations are overcome by embodiments of the present invention, which include a device that can play digital media. The device comprises a connection for receiving content over a network and a digital rights management ("DRM") data structure that identifies rights for the received content. The content can be received from one or more content providers, over one or more channels for at least one content provider, and over one or more networks (including a wired and/or a wireless network).

The content received by the device can be protected according to the invention. In one embodiment, the content is protected by receiving the content from a provider, and identifying at least one of an aspect of the device's state when the content is received; and a channel associated with the content. This information can be used to access a digital rights management data structure and identify rights for the content. Once the rights have been identified, they are applied to the content to prevent and/or permit certain activities with respect to the content.

According to another embodiment, content is accessed and identifiers associated with the content are identified. The identifiers can include a content provider of the content, a network type over which the content is accessed, and a device state of the device when the content is accessed. The identifiers are transmitted to a remote server, which uses the identifiers to access a digital rights management data structure and thereby identify rights associated with the content, which are transmitted to the device. The device receives the rights and applies them to the content to prevent and/or permit certain activities with respect to the content.

These and other advantages and features of the present invention will become more fully apparent from the following description and appended claims, or may be learned by the practice of the invention as set forth hereinafter.

BRIEF DESCRIPTION OF THE DRAWINGS

To further clarify the advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to a personal electronic device and to the management of digital rights associated with the device's digital content. In particular, embodiments of the invention relate to digital rights management in a wired or wireless enabled personal audio/video device. One of skill in the art, with the benefit of the present disclosure, can appreciate that embodiments of the invention can be practiced in conjunction with other devices that may include, but are not limited to, personal digital assistants, cellular telephones, personal audio devices, satellite radios, and the like or any combination thereof.

Embodiments of the invention provide a platform for digital content. The platform includes digital rights management. Advantageously, the platform of digital rights management provides, by way of example, variable granularity regarding the implementation of the digital rights, dynamic implementation of digital rights, and the ability to update the digital rights as needed. The rights associated with specific content or with specific groupings of content can be updated by the content provider at any time. By way of example only, media content or content refers to World Wide Web content, digital or analog audio/video content in various formats, images in various formats, and the like or any combination thereof.

In one example, an 802.11 enabled personal audio/video device can receive content over a wireless network. The content can be delivered by various content providers. Embodiments of the invention can also dock with another device such as a computer for various reasons (e.g., altering stored content) and perform in a similar manner over the computer's connection.

Figure 1:
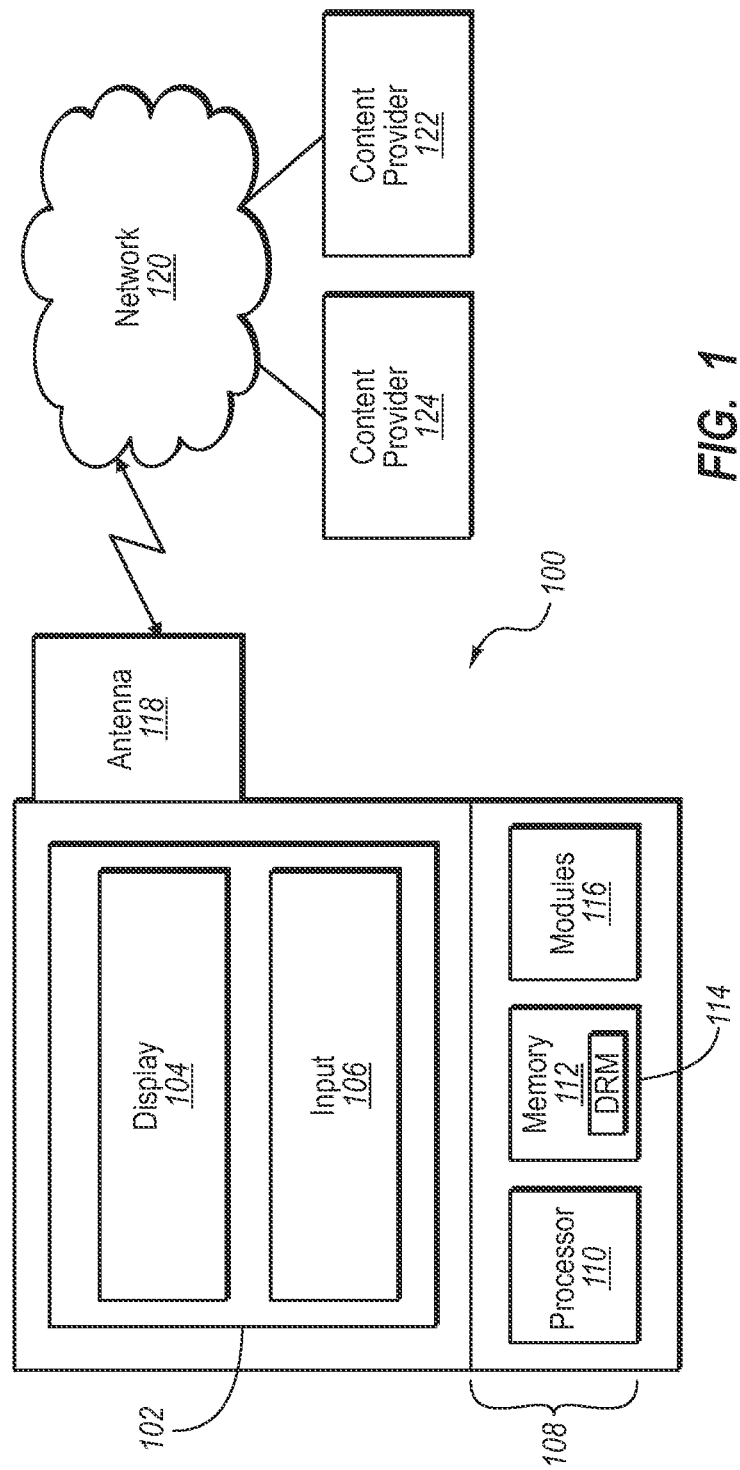
FIG. 1 illustrates an example environment for implementing embodiments of the invention.

FIG. 1 illustrates one embodiment of a device 100 that includes a platform for digital rights management. The device 100 has a user interface 102 that includes a display 104 and an input mechanism 106. The input mechanism 106 may include, but is not limited to, a click wheel, buttons, soft keys, and the like or any combination thereof. Using the user interface 102, a user can navigate content stored on the device, configure device settings, select channels, select specific networks, and the like.

The device 100 is preferably a network connectable device. Thus, the device 100 may use a connection for accessing one or more networks. The device, for example, may include the ability to access multiple types of wireless networks, including 802.11 related networks (e.g., WiFi) and others using the antenna 118, which may be a connection element facilitating the connection. The device 100, in addition to 802.11 type networks, may have access to other radio frequency networks such as a cellular network, a satellite network, and/or terrestrial RF networks (e.g., WiMAX, AM, FM, DAB (digital audio broadcasting)), etc.

The device 100, for example, may be able to access the Internet through a hardwired connection or a wireless access point (e.g., a WiFi hotspot). Once connected to the Internet, the device 100 may interact with multiple content providers, represented by the content providers 122 and 124. In one embodiment, the device 100 may access satellite broadcast content over the Internet rather than over a satellite network. The device 100 may also be able to access terrestrial radio broadcasts (digital radio, FM, AM, and the like). Further, the device 100 may also be able to receive and provide other media content, such as World Wide Web content, television content, video content and the like or any combination thereof. The network 120 represents, in one example, a wireless access point, the Internet, a local or wide area network, a satellite network, an RF network, and the like or any combination thereof.

In one example, the device 100 may be a wireless-enabled personal music device that can access media content through the Internet using wireless network connections including WiFi wireless connections. The user of the device 100 can access media content whenever the device 100 is within range of a wireless access point or whenever access to a network is present.

The device 100 also includes a processor 110, memory 112 and various modules 116. The modules 116 represent the software or computer executable instructions that, when executed, cause the device to access networks, download content, manage content, provide and control the user interface including the display 104, record media content, and the like or any combination thereof. In one embodiment, the modules 116 include a digital rights management ("DRM") module 116 that implements digital rights management in the device 100, as will be discussed more fully below. The memory 112 may store media content from the user's library on another device or may store a library of media content that has been recorded or purchased over the wireless connection or that has been shared with the device 100 from another user.

The device 100 can also include a DRM data structure 114 stored in memory 112. While the DRM module 116 and the DRM data structure 114 are depicted as separate components, they can be integrated into a single component. In particular, the DRM module 116 can include the DRM data structure 114. Alternatively, the DRM module may access the data structure 114 locally or remotely. As indicated above, digital rights management is typically intended to protect the copyright interests of the content providers or to implement policies of the content provider. Embodiments of the invention can integrate existing DRM schemes and provide additional rights management.

In one embodiment, the DRM module 116/DRM data structure 114 augment traditional DRM implementations through the use of a multi-dimensional matrix or other structure that enables rights to be protected. While the DRM data structure 114 can be implemented on the device 100 as illustrated, it can also be backed up on a remote server if desired. Alternately, the DRM data structure 114 can be implemented solely on a remote server or primarily on a remote server with a backup on the device 100. The backup copy of the DRM data structure 114 enables a device to be quickly restored with the relevant rights if necessary.

The DRM data structure 114 can be used by the DRM module 116 to identify the appropriate rights in a wide variety of different contexts and enable rights associated with media content to be described or implemented by the device 100. As described previously, the rights associated with specific content can depend on the content provider, the way that the content is delivered, the format of the content, the network connection, and other factors. The DRM data structure 114 and DRM module 116 enable the device as well as content providers to set or identify those rights based on various factors.

There are various ways or contexts in which the DRM data structure 114 may be used or accessed. In one example, the device 100 may use the DRM data structure 114 and DRM module 116 to contact a service or content provider in order to authorize the device. The device 100 can contact the service or content provider immediately when access to content is desired, or within some pre-determined period of time, and the like. The ability to authorize the device within some period of time may ensure device functionality, for example, in situations where a network connection may not be available. In one embodiment, the rights identified in the DRM data structure 114 and accessible by the DRM module 116 can be temporally cached so that if the user does not have a network connection, the content may still be experienced. For example, each time that the content is accessed, an attempt is made to access the service or content provider. If successful, it resets the timer on the temporal cache. If unsuccessful, it uses the cached copy so long as the cached copy is not stale (that is, it has not exceeded the time threshold for checking in with the service).

In another example, the DRM data structure 114 can be accessed by the content provider 122. The ability of a content provider 122 to access the DRM data structure 114 therefore provides the content provider 122 with a way to update rights as needed or whenever the content provider 122 desires to change the rights. The device 100 can then immediately implement those rights. There are various situations, for example, when the rights associated with content can change. Content rights often change over time, for example. The use of the DRM data structure 114 and DRM module 116 enables those changes to be made effective at a device level and enables the rights of different users with different devices to easily account for differences between devices, differences between user subscriptions, differences between content providers, differences between networks, and the like or any combination thereof.

In one embodiment, the DRM data structure 114 comprises a multi-dimensional DRM matrix that includes axes and/or entries that are related to: 1) channels or songs; 2) states of local device (e.g., channels, device capabilities, subscription, content of provider, content delivery); and 3) actions permitted and rights protected. In one embodiment, each entry in the DRM matrix corresponds to specific rights for a given situation that can be described in terms of the axes of the DRM matrix.

As indicated above, one of the axes of the DRM matrix may be the device state. In some instances, the state of the local device is determined in part by the results of previous interactions with a service or content provider to set the device's capabilities, channels, subscription level, and the like or any combination thereof Other aspects of the device state include the type of device, its capabilities, the media usage behavior of the device since the device last communicated with the service, and the like or any combination thereof.

When decisions relating to rights are based on a matrix of criteria, such as may be included in the DRM data structure 114, the device state may also include state that is established by a service or content provider during prior communications or during a current communication. For example, a service or other content provider may participate and/or manage the coordination of multiple DRM schemes, rights sets, subscription levels, and the like or any combination thereof For example, a service can coordinate the management of DRM schemes for multiple content providers and/or multiple content owners. The device and the service can cooperate over the network to enforce the specific rights set in the DRM, even in situations where network communication is lost or currently not present.

As previously described, the DRM matrix can have one or more axes. Note that, while described as comprising a DRM matrix, the DRM data structure 114 can be represented in other manners and may be resident on the device and/or on a remote server. Thus, the device may simply transmit the various identifiers (e.g., content provider, network type, device state) to the remote server and the remote server can access a DRM data structure (such as a DRM matrix) and return the relevant rights for the configuration identified by the device.

A matrix configuration for the DRM data structure 114 is useful because different types of content have different types of permitted activities according to the preferences of the content owners or of the content providers and/or the associated copyrights. Some content, for example, can be recorded whereas other content cannot be recorded. The DRM data structure 114 enables the permitted actions with regard to content to be expansive, scalable, and customizable. Further, the permitted actions can be arbitrary. For example, sharing permissions, ability to play back the content a specified number of times, volume limits, and the like are examples of rights that may be applied to the content.

For example, the rights identified in the DRM data structure and enforced by the DRM module for content received from a first content provider such as a satellite radio content provider may prevent the content from being recorded while the rights for the same content received over a terrestrial network may allow the content to be recorded. In this case, the content provided by the satellite radio content provider can be received over the satellite network or over the Internet through a wireless access point or a hardwired connection. The rights identified in the DRM data structure 114 and enforced by the DRM module 116 may depend on whether the content is received over the Internet or over a satellite network.

Beneficially, the content provider may have the ability to access the DRM data structure 114 and change the rights stored therein. This is particularly true when the device 100 is accessing the content via a wireless access point. The protocol of this type of connection enables easily established bi-directional communication with the content provider. Alternatively, a user may be able to access updates to the DRM data structure 114 manually or automatically. In this case, content providers may post their rights to a website and the device 100 may be able to update its DRM data structure 114 by accessing the website.

Conventional DRM schemes rely on static interpretations of rights in that the rights are created at the time the content is loaded and cannot typically be changed after creation. The DRM data structure 114 described herein provides dynamic rights that can be changed and are not static. In some instances, the rights are related to the transport method, dynamic rights checking, state variables in addition to time, and the like. In other words, the accessing of the DRM data structure 114 extends the traditional capabilities of DRM by allowing for these rights to change based on input from at least one of the content holder, content owner, or content provider.

Figure 2B:
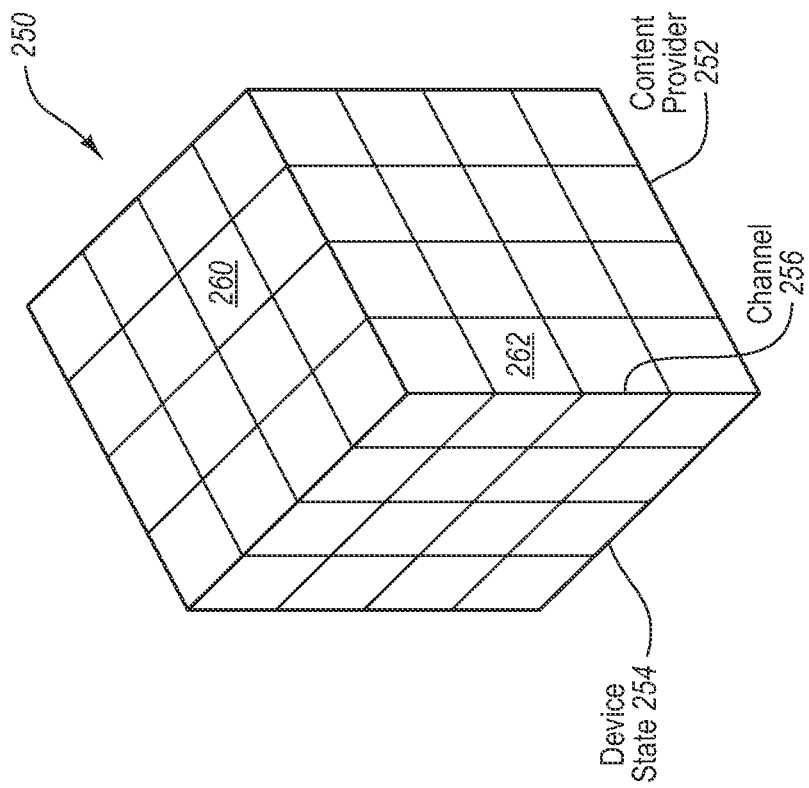
FIGS. 2A and 2B illustrate embodiments of digital rights management that may be implemented at a device where consumption of digital content typically occurs.
Figure 2A:
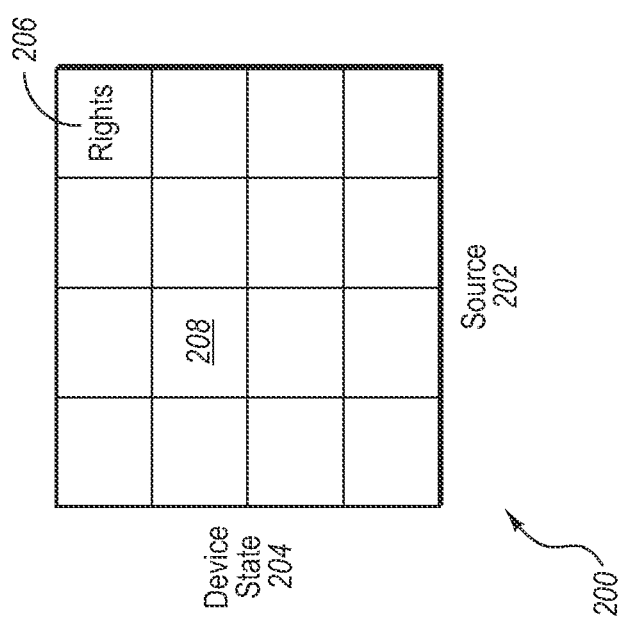

FIGS. 2A and 2B illustrate embodiments of a DRM matrix which may be implemented in the DRM data structure 114 of FIG. 1. For simplicity and ease of illustration, FIG. 2A illustrates a two-dimensional DRM matrix 200 and FIG. 2B illustrates a three-dimensional matrix 250. In FIG. 2A, the DRM matrix 200 has axes that include a source 202 and a device state 204. Each entry in the DRM matrix 200 includes the rights for the various permutations or configurations that are possible based on the axes.

The source 202 can typically be determined by the device 100. Alternatively, the source information may be included in the stream of content delivered to the device 100. A content provider is one example of a source 202. The DRM data structure 200 allows rights to be set for content from each source. Furthermore, the rights for each source may depend on the device state 204.

The device state 204 may refer to how the device is operating and can also be identified by the device. The device state may include a subscription level of the device. For instance, the rights available to a device at a first subscription level may exceed the rights available to the device at a second subscription level. In addition to the specific examples already given, the device state 204 may refer to the network over which content is being received (e.g., Internet, satellite, terrestrial radio). Device state may also include such items as number of times some particular content has been accessed.

Once the source 202 and the device state 204 are determined, the corresponding entry in the DRM matrix 200, such as the entry 206, then identifies the rights that are applicable to the content being received or played. Once the rights are identified, those rights can be implemented for relevant content by the DRM module 116 on the device 100. As previously indicated, the device may also access a content provider based on the entry 206 to authorize the device 100 according to those specific rights in one example.

This enables the rights associated with various content sources and/or providers to be implemented dynamically. As previously indicated, the DRM matrix 200 can also be updated by a particular source or for a particular device state without impacting other rights associated with other device states. In some instances, the service or content provider may be able to push rights to the device as changes are made. The device may also be able to pull updated rights from the DRM matrix 200 automatically.

FIG. 2B illustrates one embodiment of a three-dimensional DRM matrix 250. The DRM matrix 250 may have similar functionality as compared to the DRM matrix 200 of FIG. 2A. However, the DRM matrix 250 has a third axis which enables finer granularity in providing digital rights management. In the present case, the DRM matrix 250 has axes that include content provider 252, device state 254, and channel 256. As previously indicated, the device 100 may be configured to identify the content provider 252 and the device state 254. Additionally, the device 100 may be configured to identify the channel 256. Alternately, the content provider 252, device state 254 and channel 256 information may be included in the stream of content delivered to the device 100.

The channel may be a particular stream of content and may refer to one of the channels of content offered by a satellite radio provider or to a channel of content from a terrestrial radio, online radio, or online provider of media content. In each case, the DRM matrix 250 enables the various content providers 252 of the channels 256 to set rights according to specific channels of content. Further, the rights may additionally depend on the device state 254. For example, a satellite radio content provider that delivers content to a device over the Internet may provide multiple channels of content (e.g., a rock channel, a country channel, a sports channel). The DRM matrix 200 may include one or more rights entries for each of these channels and for different device states. Thus, the content provider can specify rights based on a per channel basis as well as using other factors, such as device state, if desired.

As with the DRM matrix 200 of FIG. 2A, once the content provider 252, device state 254 and channel 256 are identified, a corresponding entry, such as the entry 260, then identifies the rights that are applicable to the content being received or played. Those rights can be implemented for relevant content by the DRM module 116 and/or a content provider can be accessed based on the entry 260 to authorize the device 100 according to those specific rights.

One advantage of the DRM matrices 200 and 250 is that they can be related to and/or used to control a dynamic interface that may reflect the specific rights in the DRM matrices 200, 250. For example, a device may have the ability to save content, record content, share content, and the like or any combination thereof. Often these abilities are dependent on the rights associated with the content as identified in the DRM matrices 200 and 250.

One of skill in the art, with the benefit of this disclosure, can envision other methods for implementing DRM as described herein, including using a database in place of the multi-dimensional matrix. Further, one of skill in the art can also appreciate that a DRM matrix can have four or more dimensions. These dimensions can be used to further specify rights to content in any manner desired. For example, the DRM matrix may have an artist axis, a song axis, a subscription axis, a network axis, and the like or any combination thereof. Thus, a DRM matrix provides fine granularity as well as scalability to content providers and/or to artists.

Figure 4:
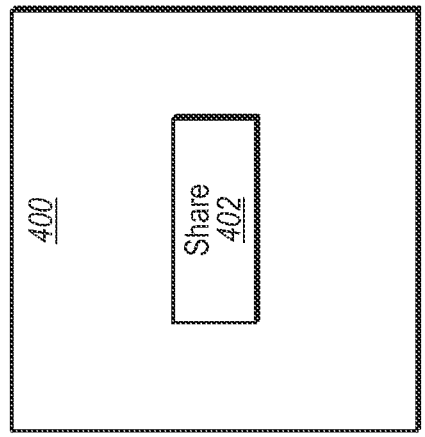
FIG. 4 illustrates another display that presents options available to the user based on rights associated with the content.
Figure 3:
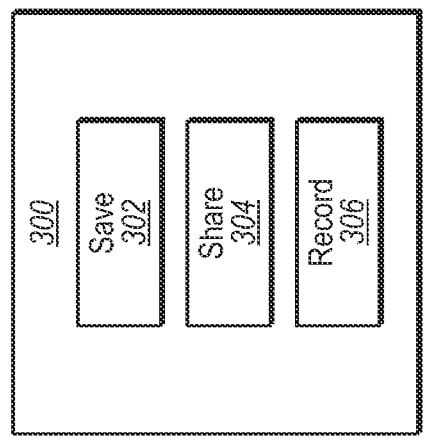
FIG. 3 illustrates one embodiment of a display that presents some of the options available to a user based on the rights associated with the content.

Embodiments of the invention can update the user interface dynamically. FIG. 3, for example, illustrates a display 300 that presents the permitted activities available to the user for a particular channel as identified in the DRM matrix 200 or 250. A user may be allowed, based on the rights 206 or 260 from the DRM matrix 200 or 250, for example, to save 302, share 304, or record 306 the content delivered to the device 100. The rights 208 or 262 for another channel of content, on the other hand may be different. FIG. 4 illustrates a display 400 that presents the permitted activities available to the user for this channel. More particularly, the user is allowed to share 402 the content.

The display can therefore be updated dynamically as the user changes channels or switches sources or changes the device state, or any combination thereof. Thus, as a user browses the content that is accessible to a device or experiences content that is available to the device, the user interface can dynamically reflect the rights afforded the user.

Figure 5:
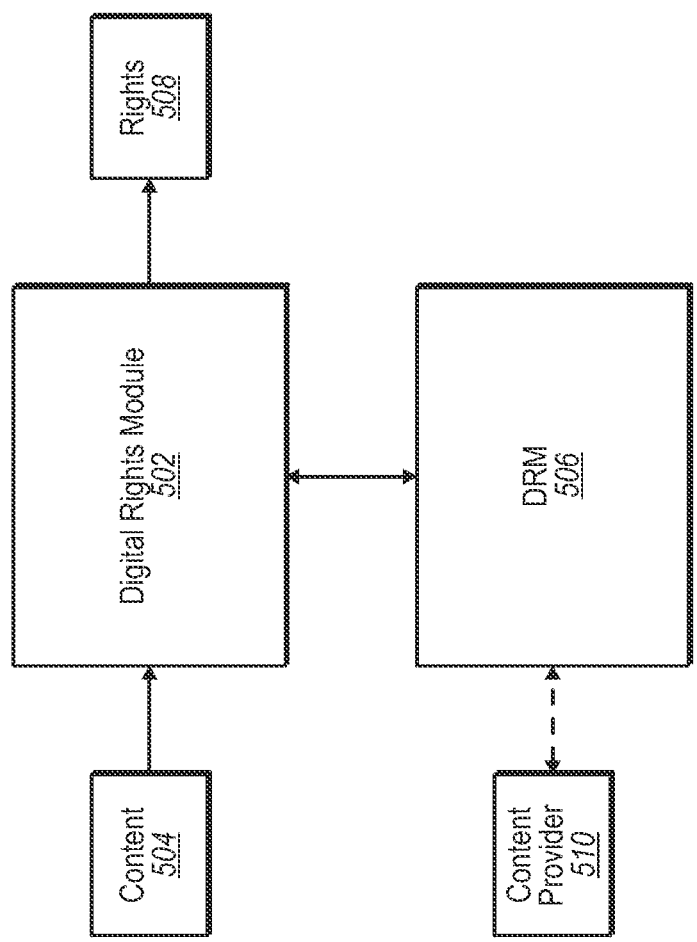
FIG. 5 illustrates a system and method for performing digital rights management.

FIG. 5 illustrates a method for dynamically updating rights and/or for setting rights for content. In this example, a DRM module 502 operating on a device receives content 504 from a content provider. The DRM module 502 may be one embodiment of the DRM module 116 of FIG. 1. The content can be received, as discussed herein, over a wired network, over a wireless network including an 802.11 network, or over another wireless network such as a satellite network or a terrestrial radio network.

The DRM module 502 receives or has access to the content 504 and to a DRM data structure 506, which may be one embodiment of the DRM matrix 200 or 250 of FIG. 2A or 2B, respectively. While illustrated separately, the DRM data structure 506 may be included within the DRM module 502. In this example, the DRM module 502 can determine the device state and/or the channel of the content from the device itself or from the content 504. Additionally, if the DRM data structure 506 includes three or more axes rather than two as in the present example, the DRM module 502 may determine values for all of the axes.

With this information, the DRM module 502 can access the DRM data structure 506 to identify the rights 508 to be applied to the content 504. Additionally, the DRM module 502 can enforce the identified rights 508 by enabling certain activities specified in the rights 508 and/or can also provide the rights to a user interface of the device for display to a user of the device.

FIG. 5 further illustrates that a content provider 510 may have access to the DRM data structure 506, enabling the content provider 510 to change or update the rights stored in or accessible to the DRM data structure 506. For example, a particular content provider that previously prevented content from being recorded may make a change that enables the content to be recorded. Advantageously, this will automatically be reflected to the display as previously described in one embodiment or this right will be enabled in the device 100. Alternatively, a content provider may open a window of time during which content can be freely shared or recorded. A content provider may also disable or delete one or more rights. More generally, the content provider or other authorized entity can set the rights for the provided content or for a portion of the provided content.

Because the DRM data structure 506 has multiple dimensions, a content provider can also provide updates according to the various dimensions of the DRM data structure 506. A content provider, for example, can change rights for a particular channel, for a particular transport method for the content, for a particular artist, for a particular song, album, video, and the like or any combination thereof that are supported by the DRM data structure 506.

The DRM data structure 506 can also be used by the DRM module to determine whether there is a permissible way to obtain content in a manner desired by the user. For example, the user may desire to record content, but currently be prevented from doing so. The DRM module may query the DRM data structure to determine if there is a combination that enables the content to be recorded. Some solutions identified by the DRM module may include, but are not limited to, switching to a channel with different rights on the content, purchasing the content, changing a user's service subscription, and the like.

In another embodiment, the content provider can include certain tags in the content 504 that can impact the rights in a dynamic fashion. For example, a tag may be included that enables content to be recorded for a certain time period. This could enable a user to record a preview of a song and then share that preview with others for example. The tag that is included in this manner can be used to control any aspect of the content (e.g., volume control, number of times recorded media can be played/shared, quality of recording, and the like or any combination thereof).

Those skilled in the art will appreciate that various of the foregoing features of the invention may be practiced alone or in network environments with many types of computer system configurations, including media players, satellite radio receivers, AM/FM transmitters or receivers, DAB transmitters or receivers, personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 6:
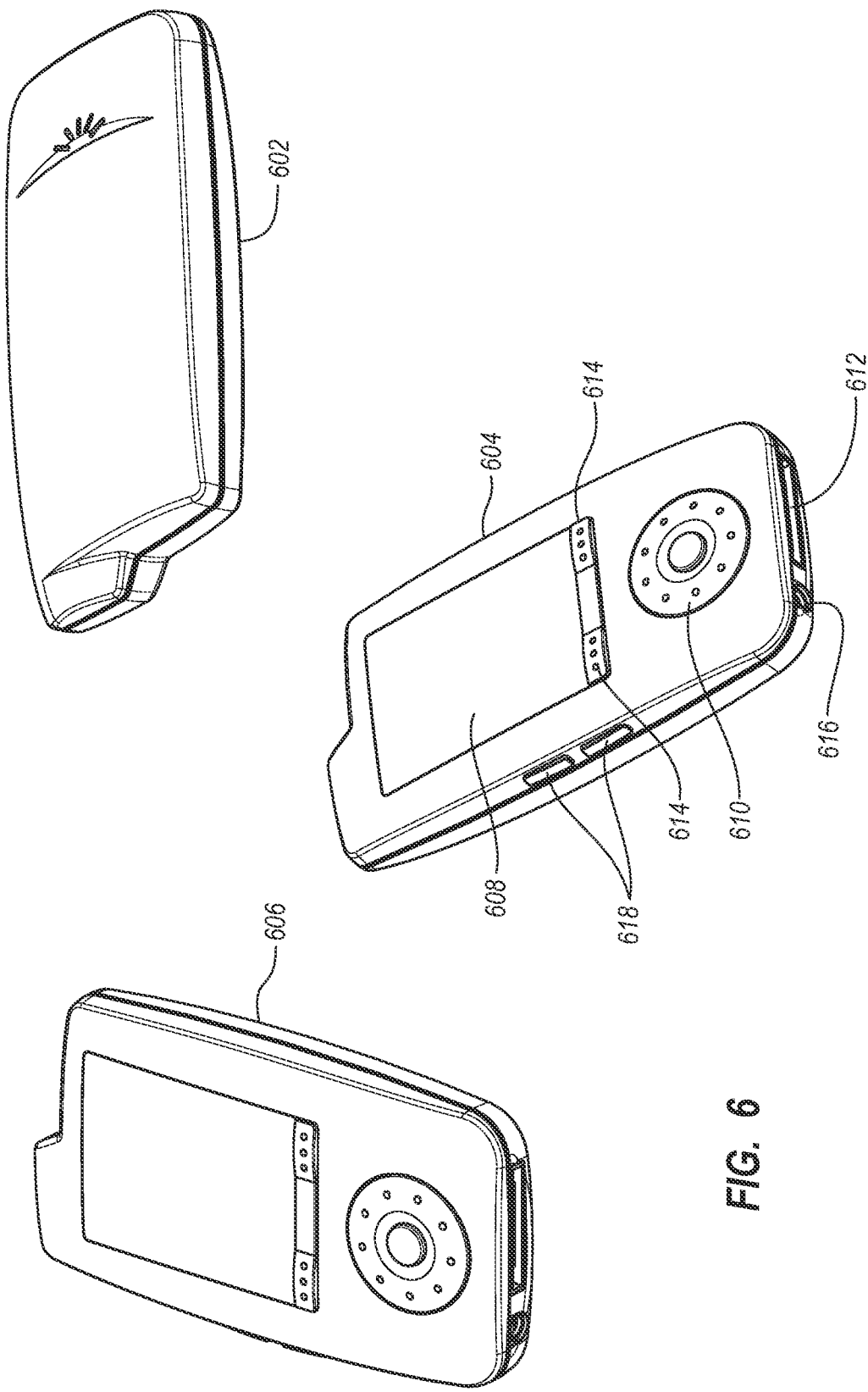
FIG. 6 illustrates perspective front and rear views of one embodiment of a device that implements digital rights management.

FIG. 6 illustrates perspective views of one embodiment of a personal audio and/or video device with display and navigation mechanisms that can be used in conjunction with the features of the present invention. FIG. 6 illustrates one view of the rear portion 602 of the device and two views of the front portion 604 and 606. In this example, the device is a hand-held device, although larger devices can also be used. The device includes a display 608 having various display methods. A user can interact with the device using a touchpad 610, electromechanical keys on a keypad, such as arrow keys and alphanumeric keys, soft keys 614 on display 608, a navigation wheel, other device buttons 618, a remote control device (not shown) associated with the device, voice commands, or by moving the communication device in a particular way. The device may also include port 616 for connecting audio headgear and port 612 for connecting the device to a docking station or connector for charging the device. Of course, the device can include any of a variety of configurations and designs that are contemplated within the scope of the present invention.

Embodiments of the device may include computer-readable media for carrying or having computer-executable instructions or data structures stored thereon. Such computer-readable media can be any available media that can be accessed by a portable device or general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a portable device or general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention may be described in the general context of computer-executable instructions, such as program modules, being executed by computers in network environments. Generally, program modules include acts, routines, programs, objects, components, data structures, etc. that perform particular tasks or implement particular abstract data types. Computer-executable instructions, associated data structures, and program modules represent examples of the program code means for executing acts of the methods disclosed herein. The particular sequence of such executable instructions or associated data structures represents examples of corresponding acts for implementing the functions described in such acts.

The devices may also include a magnetic hard disk drive for reading from and writing to a magnetic hard disk, a magnetic disk drive for reading from or writing to a removable magnetic disk, or an optical disk drive for reading from or writing to removable optical disk such as a CD-ROM or other optical media. The device may also include non-volatile memory including flash memory. The drives and their associated computer-readable media provide nonvolatile storage of computer-executable instructions, data structures, program modules and other data. Although the example environment described herein may employ a magnetic hard disk, a removable magnetic disk and/or a removable optical disk, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk, magnetic disk, optical disk, ROM or RAM, including an operating system, one or more application programs, other program modules, and program data. A user may enter commands and information through a keyboard, pointing device, or other input devices (not shown), such as a microphone, joy stick, touch pad, game pad, satellite dish, scanner, or the like. These and other input devices are often connected to the processing unit through a universal serial bus (USB) or serial port interface coupled to system bus. Alternatively, the input devices may be connected by other interfaces, such as a parallel port, or a game port. A display device is also connected to system bus via an interface, such as video adapter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system that can play digital media, the system comprising:
 a device;
 a user interface configured to allow a user of the device to access content stored on the device and configure device settings;
 a memory having stored thereon a data structure;

a connection element that facilitates receipt by the device of content over a network, wherein the received content is at least partially stored in the memory; and a digital rights management module stored on a storage medium of the device that when executed by a processor of the device is configured to identify and enforce rights stored within the data structure, wherein the data structure is in the form of a multi-dimensional matrix having at least three axes for defining the rights, the axes representing at least a device state, a source, and a channel, wherein the digital rights management module is configured to enforce the rights by identifying a first configuration, the first configuration including a unique set of identifiers, including an identifier for each of the device state axis, source axis, and channel axis, wherein the digital rights management module is configured to, after identifying what the identifiers are for each of the device state, source, and channel axes in the first configuration, access a first rights entry of the multi-dimensional matrix, the first rights entry including first specific rights particular to the first configuration based on the respective identifier corresponding to each of the at least three axes and to enforce those first specific rights, wherein a change to an identifier corresponding to any or all of the device state axis, the source axis, or the channel axis results in a change to a second configuration, wherein the digital rights management module is configured to access a second rights entry of the multi-dimensional matrix in response to the change to the second configuration the second rights entry including second specific rights particular to the second configuration based on the changed identifier corresponding to an or all of the device state, source, or channel axes, and to enforce those second specific rights;

wherein the device is configured to allow a user of the device to manually access updates to the data structure;

wherein the digital rights management module is configured to receive data from a content provider in response to the digital rights management module sending a request to the content provider; and wherein the data structure is configured to be accessed and updated by the content provider when changes occur to the rights.

2. The system of claim 1, wherein the user interface is further configured to display to the user of the device one or more activities that are permitted for the content, the one or more permitted activities based on the rights identified for the content.

3. The system of claim 1, wherein rights applicable to specific content are identified by accessing the data structure using one or more of a channel, a content provider, and a device state identified by the digital rights management module.

4. The system of claim 1, wherein the device includes a temporal cache for storing the rights on the device for a predetermined period of time, such that the digital rights management module can identify and enforce the rights by accessing the temporal cache during the predetermined period of time.

5. The system of claim 1, wherein the device accesses a service to enforce rights in the data structure.

6. The system of claim 1, wherein the data structure is updated periodically either by the device or by a remote service.

7. The system of claim 1, wherein the device state comprises one or more of:
   a type of the device;
   one or more capabilities of the device;
   media usage behavior of the device since the device last communicated with a service, wherein the service cooperates with the digital rights management module to set or enforce rights for the content;
   subscription level; and
   network type.

8. The system of claim 1, wherein the one or more networks over which content can be received include at least one wireless network.

* * * * *